United States Patent
Gray et al.

(10) Patent No.: US 9,763,373 B2
(45) Date of Patent: Sep. 19, 2017

(54) SEED BED PREPARATION AND TILLAGE APPARATUS

(71) Applicant: Salford Farm Machinery Ltd., Salford (CA)

(72) Inventors: Geof J. Gray, Burford (CA); Simon Goveia, Mossley (CA); John Mark Averink, Norwich (CA)

(73) Assignee: Salford Group Inc., Salford (CA)

( * ) Notice: Subject to any disclaimer, the term of this patent is extended or adjusted under 35 U.S.C. 154(b) by 0 days.

(21) Appl. No.: 13/922,653

(22) Filed: Jun. 20, 2013

(65) Prior Publication Data

US 2014/0374128 A1 Dec. 25, 2014

(51) Int. Cl.
*A01B 49/02* (2006.01)
*A01B 63/32* (2006.01)
*A01B 49/06* (2006.01)

(52) U.S. Cl.
CPC ............ *A01B 49/02* (2013.01); *A01B 49/027* (2013.01); *A01B 63/32* (2013.01); *A01B 49/06* (2013.01)

(58) Field of Classification Search
CPC ....... A01B 49/02; A01B 61/046; A01B 13/08; A01B 63/32; A01B 63/30; A01B 63/008; A01B 35/32; A01B 49/027; A01B 49/06; A01C 7/203; A01C 7/208
See application file for complete search history.

(56) References Cited

U.S. PATENT DOCUMENTS

| 2,005,568 | A | * | 6/1935 | Smith | 172/468 |
|---|---|---|---|---|---|
| 2,264,575 | A | * | 12/1941 | Knapp et al. | 172/294 |
| 2,362,578 | A | * | 11/1944 | Mott | 172/295 |
| 2,379,779 | A | * | 7/1945 | Ash | A01B 61/00 172/261 |
| 2,713,299 | A | * | 7/1955 | Shager et al. | 172/195 |
| 3,034,238 | A | * | 5/1962 | McGee | 172/777 |
| 3,135,337 | A | * | 6/1964 | Morris | 172/44 |
| 3,208,535 | A | * | 9/1965 | Fischer | 172/6 |
| 3,321,031 | A | * | 5/1967 | Evans | A01B 35/08 172/260.5 |
| 3,325,228 | A | * | 6/1967 | Lien | 403/188 |
| 3,561,541 | A | * | 2/1971 | Woelfel | A01B 61/046 172/260.5 |
| 3,757,871 | A | * | 9/1973 | Maust et al. | 172/178 |

(Continued)

*Primary Examiner* — Robert E Pezzuto
*Assistant Examiner* — Jessica H Lutz
(74) *Attorney, Agent, or Firm* — Brunet & Co. Ltd.; Robert Brunet

(57) ABSTRACT

A tillage apparatus for selective primary tillage and seed bed preparation makes use of a selectively moveable primary tillage shank to provide seasonal, in-field and/or on-the-fly flexibility of tillage operation. The tillage apparatus has a cultivator frame, at least one secondary tillage tool mounted on the frame and a primary tillage shank mounted on the frame, the primary tillage shank selectively moveable between a lowered soil engaging position and a raised disengaged position. In a method of tilling or preparing a seed bed, the tillage apparatus is dragged around a field with the at least one secondary tillage tool engaged with the field when secondary tillage of the field is desired, and the selectively moveable primary tillage shank lowered to be engaged with the field when the field is in need of primary tillage or raised to be disengaged from the field when primary tillage is not desired.

19 Claims, 9 Drawing Sheets

(56) References Cited

U.S. PATENT DOCUMENTS

| | | | |
|---|---|---|---|
| 4,048,929 A * | 9/1977 | Zumbahlen | 111/146 |
| 4,102,404 A * | 7/1978 | Krammer | A01B 35/30 |
| | | | 172/266 |
| 4,248,310 A * | 2/1981 | McWilliams | A01B 63/32 |
| | | | 172/661 |
| 4,361,191 A * | 11/1982 | Landoll et al. | 172/146 |
| 4,444,271 A * | 4/1984 | Dietrich, Sr. | A01B 49/02 |
| | | | 172/140 |
| 4,865,132 A * | 9/1989 | Moore, Jr. | A01B 13/08 |
| | | | 172/140 |
| 5,129,463 A * | 7/1992 | Handy | A01B 73/005 |
| | | | 172/248 |
| 5,207,279 A * | 5/1993 | Nelson et al. | 172/140 |
| 5,450,908 A * | 9/1995 | Hagman et al. | 172/239 |
| 5,499,685 A * | 3/1996 | Downing, Jr. | A01B 13/08 |
| | | | 111/140 |
| 5,797,460 A * | 8/1998 | Parker | A01B 13/08 |
| | | | 172/151 |
| 6,216,616 B1 * | 4/2001 | Bourgault | 111/186 |
| 6,425,445 B1 * | 7/2002 | Tarver, III | 172/166 |
| 8,657,023 B2 * | 2/2014 | Casper | A01B 63/111 |
| | | | 172/145 |
| 2004/0016554 A1 * | 1/2004 | McDonald | A01B 49/027 |
| | | | 172/146 |
| 2006/0021768 A1 * | 2/2006 | Ankenman | 172/146 |
| 2006/0021769 A1 * | 2/2006 | Ankenman et al. | 172/156 |
| 2006/0048953 A1 * | 3/2006 | Rozendaal et al. | 172/35 |
| 2008/0142233 A1 * | 6/2008 | Hurtis et al. | 172/177 |
| 2012/0227991 A1 * | 9/2012 | Hake et al. | 172/1 |

* cited by examiner

SEED BED PREPARATION AND TILLAGE APPARATUS

FIELD OF THE INVENTION

The present invention relates to an apparatus and method for preparing an agricultural field for planting.

BACKGROUND OF THE INVENTION

Apparatuses, systems and methods for tilling agricultural fields are very well known in the art. Apparatuses typically comprise a cultivator frame having multiple and various tilling attachments attached thereto, laid out on the frame in a variety of patterns to maximize the desired tilling effect. The apparatus is dragged behind a vehicle during the tilling operation.

In general, a single apparatus is equipped to perform either primary or secondary tillage. Primary tillage implements displace and shatter soil to reduce soil strength and to bury or mix plant materials, pesticides, and fertilizers in the tillage layer. Primary tillage is more aggressive, deeper, and leaves a rougher soil surface relative to secondary tillage. Secondary tillage implements till the soil to a shallower depth than primary tillage implements, provide additional pulverization, mix pesticides and fertilizers into the soil, level and firm the soil, close air pockets, and eradicate weeds. Seedbed preparation is the final secondary tillage operation. Primary tillage tools are sometimes used together in the same implement to produce different effects. Likewise, secondary tillage tools are sometimes used together in the same implement to produce different effects.

In particular, conservation tillage, or vertical tillage as it is sometimes called, is a form of secondary tillage that has recently become a tilling strategy of choice in many instances. Conservation tillage minimally disturbs the soil prior to planting in order to allow air to penetrate the mat of crop residue left in the field from the previous harvest. Apparatuses, systems and methods for conservation tillage are known in the art, for example United States patents U.S. Pat. No. 7,762,345 issued Jul. 27, 2010, U.S. Pat. No. 8,113,295 issued Feb. 14, 2012, U.S. Pat. No. 8,196,672 issue Jun. 12, 2012, U.S. Pat. No. 8,307,908 issued Nov. 13, 2012 and U.S. Pat. No. 8,307,909 issued Nov. 13, 2012, the entire contents of all of which are herein incorporated by reference.

However, it is sometimes useful or necessary to perform primary tillage on a field prior to conservation tillage and seed bed preparation. For example, in fields with low lying areas or poor drainage, water accumulation may pack and roughen the soil creating hard uneven sections in certain areas of the field. Because these sections are often localized in certain areas, it is inefficient to bring in a primary tillage apparatus just to loosen these sections before performing conservation tillage and seed bed preparation on the field as a whole.

Thus, there is a need for a more efficient way to perform primary tillage operations during or instead of secondary (e.g. conservation) tillage or seed bed preparation operations.

SUMMARY OF THE INVENTION

It has now been found that a tillage apparatus for selective primary tillage and seed bed preparation can make use of a primary tillage shank that is selectively moveable between a lowered soil engaging position and a raised disengaged position to provide seasonal, in-field and/or on-the-fly flexibility of tillage operation.

Thus, according to one aspect of the present invention, there is provided a tillage apparatus comprising: a cultivator frame; at least one secondary tillage tool mounted on the frame; and a primary tillage shank mounted on the frame, the primary tillage shank selectively moveable between a lowered soil engaging position and a raised disengaged position.

In a second aspect of the invention, there is provided a method of tilling or preparing a seed bed in a field, comprising: dragging a tillage apparatus of the present invention around a field with the at least one secondary tillage tool engaged with the field when secondary tillage of the field is desired; and, selectively lowering the primary tillage shank to be engaged with the field when the field is in need of primary tillage or selectively raising the primary tillage shank to disengage the shank from the field when the field is not in need of primary tillage.

The cultivator frame has a longitudinal axis in the direction of motion of the tillage apparatus as it is being dragged across the field. The longitudinal axis runs from front to rear (or rear to front) of the frame. The cultivator frame has a transverse axis that is perpendicular to the longitudinal axis and runs left to right (or right to left) of the frame. The front end of the frame is mounted to the transportation (e.g. a vehicle, such as a tractor or a truck) that drags the apparatus. The cultivator frame may have a plurality of longitudinally spaced apart transverse frame-members and a plurality of transversely spaced apart longitudinal frame-members. Tillage tools and wheels are generally mounted on one or more of the frame-members.

The tillage apparatus comprises a primary tillage shank that is selectively moveable between a lowered soil engaging position and a raised disengaged position. Primary tillage shanks are hard generally rigid members mounted on the cultivator frame and which are drawn through soil during primary tillage operations to displace and shatter soil to reduce soil strength and to bury or mix plant materials, pesticides and/or fertilizers in the tillage layer. Their rigidity permits primary tillage shanks to be drawn deeply through the soil. The shanks alone may be used as the primary tillage tool, or another primary tillage tools may be mounted on the shank. Other primary tillage tools include, for example, plows (e.g. chisel plows, moldboard plows), combination chisel with cutting blades, coulter wheels, disks, bedders, subsoilers, etc. The selectively moveable shank may be deliberately raised away from the soil to disengage from the soil, or deliberately lowered into the soil for engagement with the soil. Control of the raising and lowering may be performed by an operator of apparatus. The operator may be in the cab of a vehicle dragging the apparatus or in some other remote location. Thus, the operator is able to selectively convert a single apparatus between a primary and secondary tillage implement depending on field conditions, seasonal needs and the like.

Raising and lowering of the primary tillage shank may be accomplished in any suitable manner. For example, the shank may be actuated by an actuator. Actuators include, for example, hydraulics, mechanical springs (e.g. coils, leafs), etc. When engaged with the field, the shanks should be locked into place to prevent them from being forced out of engagement with the soil. Conveniently, a hydraulic cylinder (e.g. dual-acting hydraulic cylinder) can be used to selectively raise and lower the shank and keep the shank locked into place during operation.

The primary tillage shank may be conveniently mounted on a frame-member, e.g. a transverse or longitudinal frame-member. The apparatus may comprise a plurality of shanks. Any given shank may be used alone as a primary tillage tool or have another primary tillage tool of any type mounted thereon. Shanks are preferably mounted on the frame in a transverse row whereby a plurality of shanks is in the same transverse row. There may be a plurality of longitudinally spaced-apart transverse rows of shanks. Shanks in adjacent transverse rows may be aligned or staggered (i.e. offset) between adjacent rows. In a preferred embodiment, shanks in adjacent rows are offset. In a preferred embodiment, the apparatus comprises two or three transverse rows of shanks, one row proximal the front of the apparatus and one row proximal the rear. The shanks in the front and rear transverse rows are preferably offset when viewed from the front or rear of the apparatus so that no two shanks are in the same longitudinal line. A third transverse row of primary tillage shanks may be used to provide primary tillage shanks in certain longitudinal lines if space constraints in the front or rear rows (especially the rear row) do not permit placement of a full row of shanks.

The primary tillage shanks may be mounted on the frame individually or in gangs. They may also be selectively moveable individually or in gangs. While individually selectively moveable shanks provide more flexibility of operation, it is less expensive to configure gangs of shanks to be selectively moveable. However, it can be beneficial for the shanks in separate transverse rows to be independently selectively moveable. For example, transverse spacing of the shanks depends on desired furrow spacing in the field. It is an advantage of the present apparatus that furrow spacing may be changed by selectively raising and lowering separate rows of shanks where the shanks in adjacent rows are offset. By raising every other transverse row of shanks, it is possible to have a wide spacing of furrows. By lowering all transverse rows of shanks, the furrow spacing is narrower as shanks in different rows plow different longitudinal lines. With two transverse rows of shanks, two different furrow spacings are possible, one twice as wide as the other (if the shanks in a transverse row are mounted equidistant from each other and are offset between the transverse rows). With more than two transverse rows it is possible to either make up for a shortage of space in one of the other two rows (especially the rear row), or it is possible to have three or more different furrow spacings. In a preferred embodiment with front and rear transverse rows of shanks, it is desirable that the front and rear rows of shanks be independently moveable. Movement of a make-up row of shanks may be tied to movement of the row for which the make-up row makes up.

Primary tillage shank size may be any desired size depending on the desired furrow width. In the lowered field engaging position, the depth of the shank in the soil may be set to any desired depth. Shank depth may be adjustable to accommodate different primary tillage strategies, if desired.

The tillage apparatus comprises at least one secondary tillage tool mounted on the frame. The at least one secondary tillage tool may be conveniently mounted on a transverse or longitudinal frame-member. Secondary tillage tools are distinguished from primary tillage tools primarily by the depth at which they penetrate the soil. Secondary tillage tools do not penetrate as deeply and, unlike in primary tillage, the secondary tillage shanks on which secondary tillage tools are mounted are not drawn through the soil. Further, secondary tillage shanks are generally flexible (e.g. leaf springs or coiled shanks) so the mounted secondary tillage tool has some give when engaging the soil.

The apparatus may comprise a plurality of secondary tillage tools of the same type, a plurality of secondary tillage tools of different types or any combination thereof. Secondary tillage tools are preferably mounted on the frame in a transverse row whereby a plurality of secondary tillage tools is in the same transverse row. There may be a plurality of longitudinally spaced-apart transverse rows of secondary tillage tools. Secondary tillage tools in adjacent transverse rows may be aligned or staggered (i.e. offset) between transverse rows. Secondary tillage tools may be mounted individually or in gangs. The secondary tillage tools may be fixed or selectively moveable. Secondary tillage tools include, for example, rotary harrows, disks, coulter wheels, teeth (e.g. spring, spike, powered oscillatory spike, coil, or tine), knives, packers, ridgers, levelers, cultivators, field conditioners, rod weeders, rollers, bed shapers, rotary hoes, etc.

The apparatus of the present invention may be referred to as a combination primary and conservation tillage apparatus. It has the benefit of flexibility whereby in conservation tillage mode the primary tillage tools are raised in disengagement with soil in the field, while in primary tillage mode the primary tillage tools are lowered into engagement with the soil. Raising and lowering of the primary tillage tools can be done in the field, or even on-the-fly in the field, providing an operator with flexibility of tillage choice depending on field conditions in the section of the field being tilled.

The present apparatus has the further benefit of being useful in methods for both autumn and spring tillage operations. For seed bed preparation in the spring, it is usually useful to perform conservation tillage in order to minimally disturb the soil, in which case the primary tillage tools may be raised. In the autumn, it is may be useful to perform primary tillage to plow under crop residue, in which case the primary tillage tools may be lowered into engagement with the field. The same apparatus may be used for both primary and conservation tillage operations, thereby reducing cost and saving time. Thus, the apparatus of the present invention may be referred to as a dual primary/secondary tillage apparatus.

In a further useful arrangement and method, the apparatus may be configured to deliver agricultural product to a field in combination with the specific tillage operation being performed. For example, for spring tillage operations, feeders for seed and/or pesticide (e.g. herbicide) application may be associated with one or more of the at least one secondary tillage tools and seed planted and/or pesticide applied during the conservation tillage operation. For autumn tillage operations, feeders for fertilizer (e.g. anhydrous ammonia) and/or pesticide (e.g. herbicide) application may be associated with the primary tillage tools and the fertilizer and/or pesticide applied during the primary tillage operation.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 3A is a side view, FIG. 3B is a front view and FIG. 3C is an isometric view;

FIG. 3D is a side view, FIG. 3E is a front view and FIG. 3F is an isometric view;

FIG. 5A is a side view, FIG. 5B is a front view and FIG. 5C is an isometric view;

FIG. 5D is a side view, FIG. 5E is a front view and FIG. 5F is an isometric view;

DESCRIPTION OF PREFERRED EMBODIMENTS

Referring to FIGS. 1-6, a tillage apparatus of the present invention is depicted in various configurations.

Figure 1A:
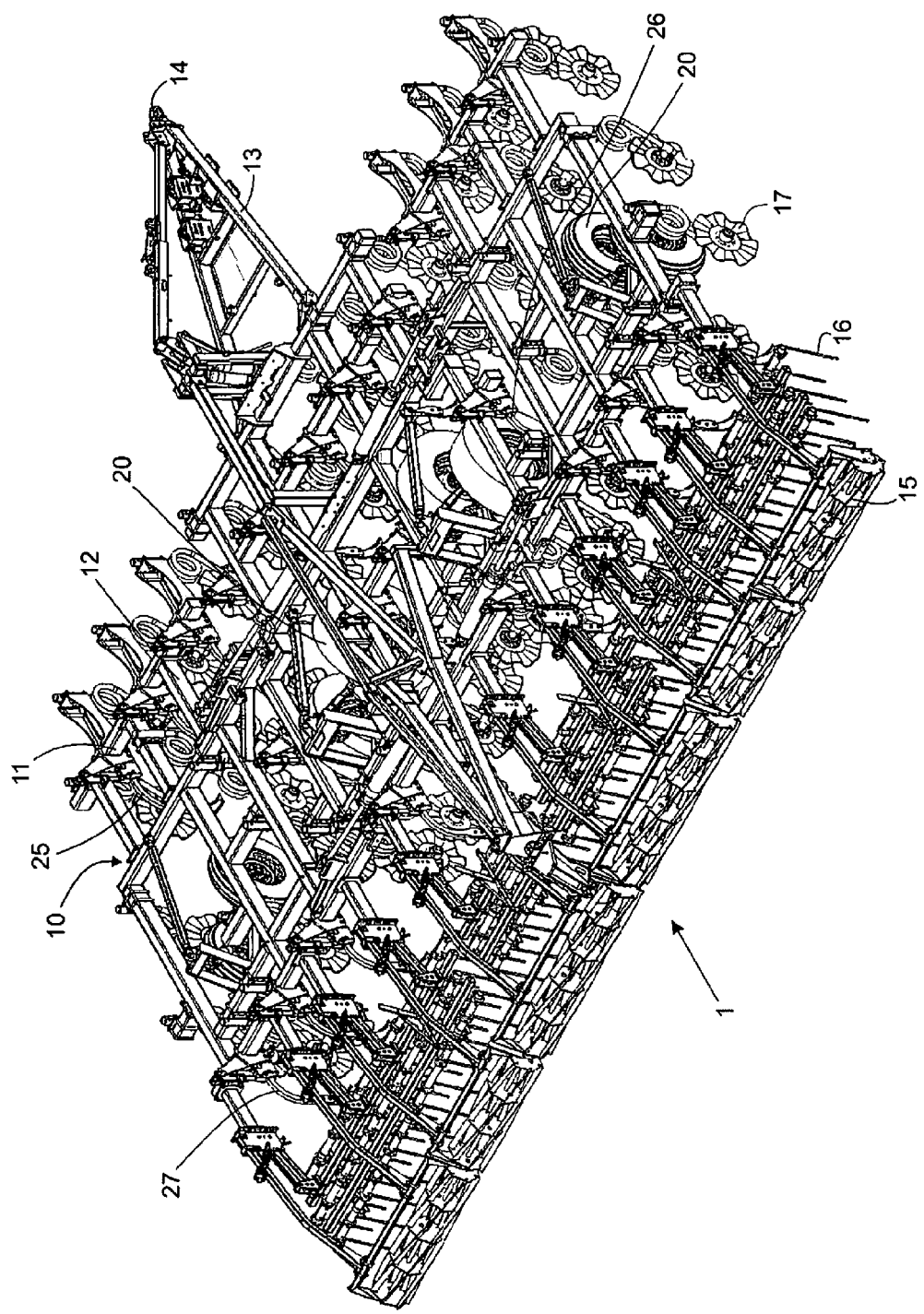
FIG. 1A is an isometric view of one embodiment of an apparatus of the present invention.
Figure 1B:
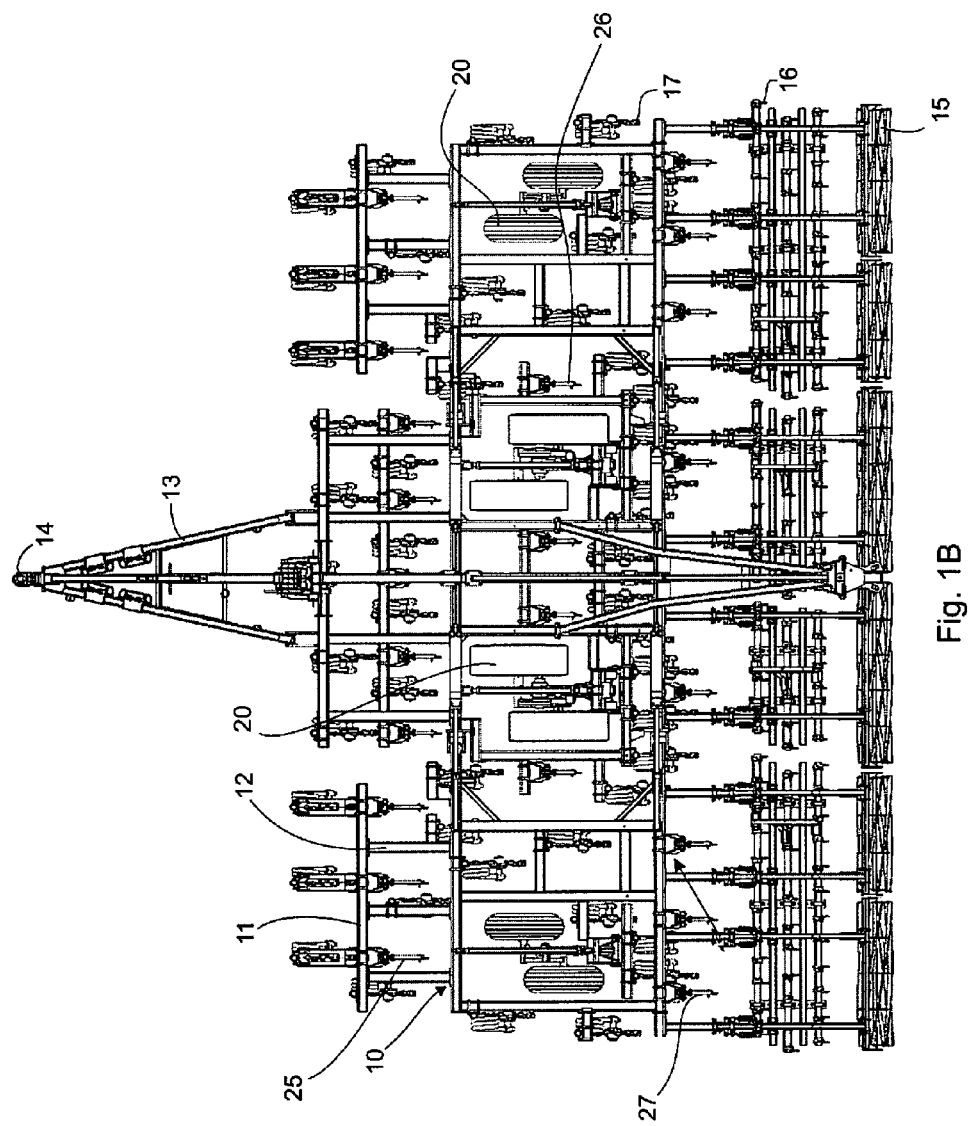
FIG. 1B is a top view of the apparatus of FIG. 1A.

FIG. 1A and FIG. 1B depict one embodiment of tillage apparatus 1 of the present invention comprising frame 10 having a plurality of transverse frame-members 11 (only one labeled) and longitudinal frame-members 12 (only one labeled). The frame includes drawbar 13 extending from the front and hitch 14 at the end of the drawbar for connecting the apparatus to a vehicle. The apparatus rides on eight wheels 20 (only two labeled).

Mounted on the frame are a plurality of secondary tillage tools including a plurality of rolling harrows 15 (only one labeled) in one transverse row at the rear of the apparatus, a plurality of tine harrows 16 (only one labeled) in three transverse rows just forward the rolling harrows, and a plurality of coulter wheels 17 (only one labeled) mounted on the frame by flexible coil elements and arranged in a plurality of transverse rows. The coulter wheels in adjacent rows are staggered (offset) so that they do not follow the same longitudinal lines when the apparatus is dragged through a field.

Also mounted on the frame are three transverse rows of selectively moveable primary tillage shanks having chisel plows mounted thereon. A front row comprises eleven primary tillage shanks 25 (only one labeled). A rear row comprises eight primary tillage shanks 27 (only one labeled) staggered (offset) from the first row of shanks. And, a middle row comprises four primary tillage shanks 26 (only one labeled), which make-up for a lack of space in the rear row. The primary tillage shanks are moveable between a lowered soil engaging position and a raised disengaged position by hydraulic cylinders, as more clearly shown in FIG. 3. The front row of primary tillage shanks is independently moveable from the rear and middle rows. Movement of the rear and middle rows is tied so that the shanks in these rows move in tandem.

The apparatus depicted in FIG. 1 may be used for various tillage operations, including, for example, primary tillage, secondary tillage and primary tillage with fertilizer application. FIG. 2 depicts three different modes in which the tillage apparatus of FIG. 1 may be used in a method for primary tillage, especially in the autumn.

Figure 2A:
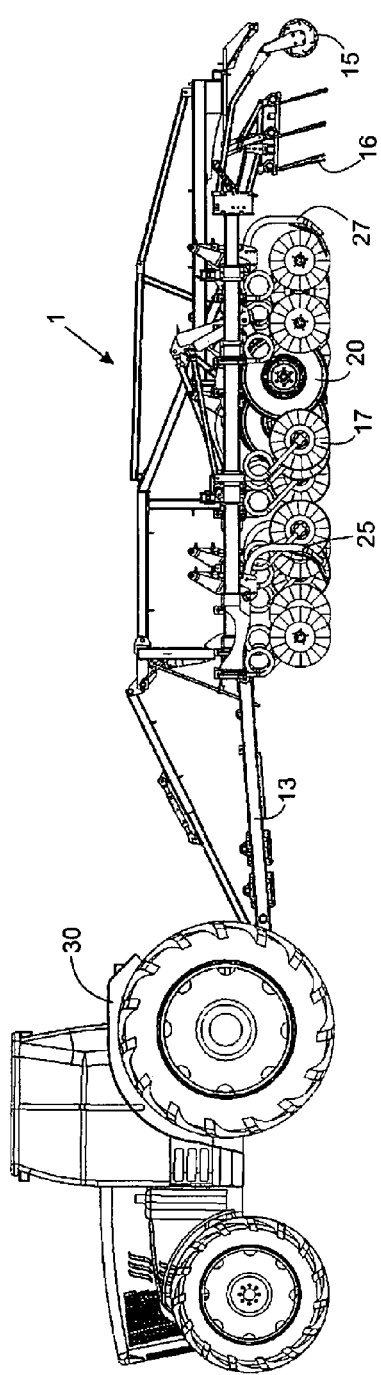
FIG. 2A is a side view of the apparatus of FIG. 1A being pulled by a tractor and configured for use in autumn with chisel plows on front, middle and rear rows of primary tillage shanks with all rows of primary tillage shanks lowered into soil engaging positions.
Figure 2B:
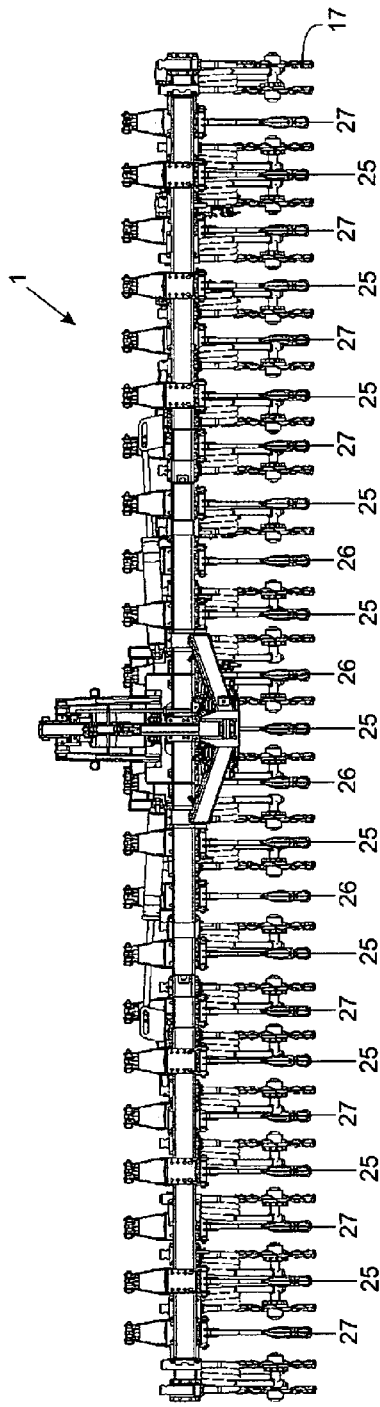
FIG. 2B is a rear end view of the apparatus depicted in FIG. 2A.

Referring to FIG. 2A and FIG. 2B, the tillage apparatus 1 as described above being dragged by tractor 30 may have all of its primary tillage shanks 25,26,27 lowered into soil engaging positions. Such an arrangement results in narrower furrow spacing. FIG. 2B shows a rear view of this arrangement with the wheels and harrows removed for clarity. It can be readily seen from FIG. 2B that the primary tillage shanks with their chisel plows are equidistantly spaced in a transverse direction, even though eleven are in the front row, four are in the middle row and eight are in the rear row. Even furrow spacing is therefore achieved.

Figure 2C:
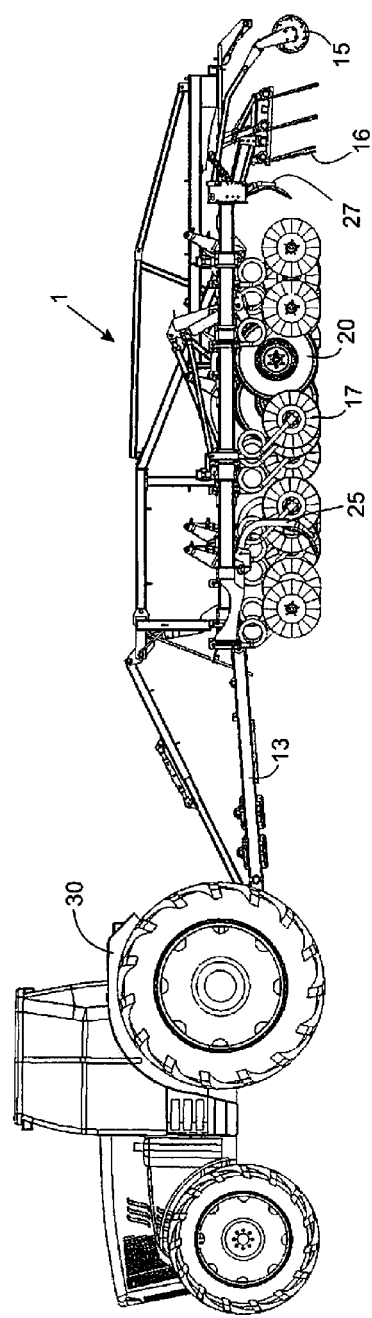
FIG. 2C is a side view of the apparatus of FIG. 1A being pulled by a tractor and configured for use in autumn with chisel plows on front, middle and rear rows of primary tillage shanks, the front row of primary tillage shanks lowered into a soil engaging position and the middle and rear rows of primary tillage shanks raised in a disengaged positions.
Figure 2D:
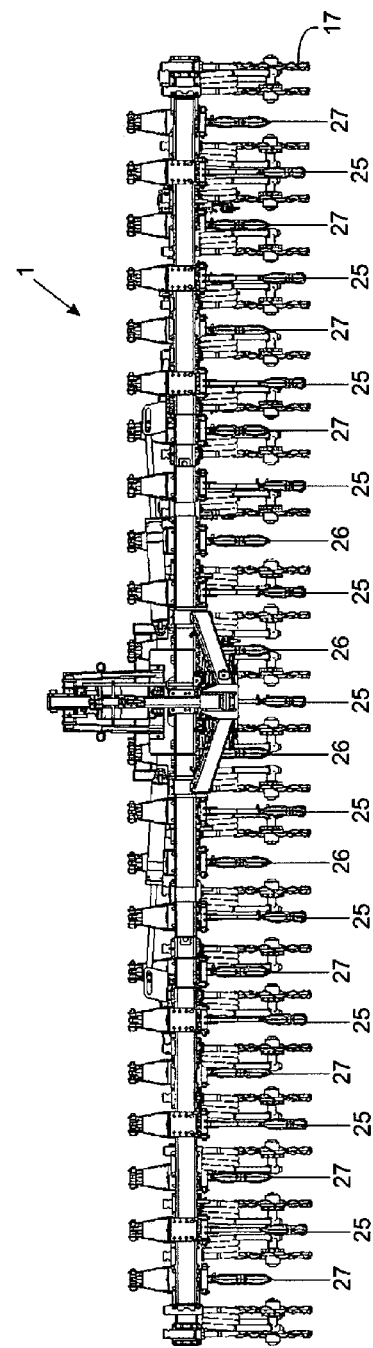
FIG. 2D is a rear end view of the apparatus depicted in FIG. 2C.

Referring to FIG. 2C and FIG. 2D, the tillage apparatus 1 as described above being dragged by tractor 30 may have the front row of primary tillage shanks 25 lowered into soil engaging positions, but the middle and rear rows of primary tillage shanks 26,27 are raised in disengaged positions. Such an arrangement results in wider furrow spacing than the arrangement in FIG. 2A and FIG. 2B. FIG. 2D shows a rear view of this arrangement with the wheels and harrows removed for clarity. It can be readily seen from FIG. 2D that the eleven primary tillage shanks 25 with their chisel plows in the soil engaging position are still equidistantly spaced in a transverse direction. Even furrow spacing is therefore achieved, but with a wider furrow spacing than in FIG. 2A and FIG. 2B.

Figure 2E:
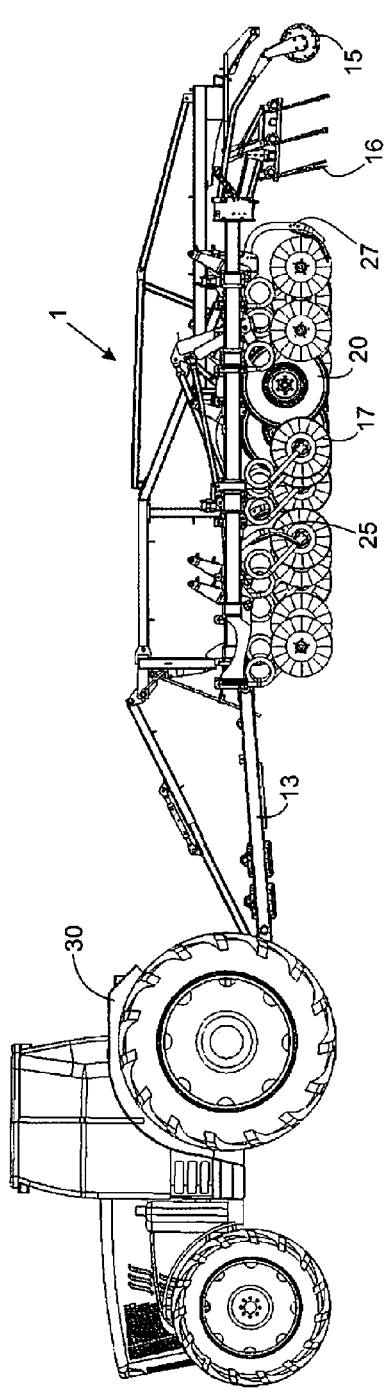
FIG. 2E is a side view of the apparatus of FIG. 1A being pulled by a tractor and configured for use in autumn with chisel plows on front, middle and rear rows of primary tillage shanks, the front row of primary tillage shanks raised in a disengaged position and the middle and rear rows of shanks lowered into soil engaging positions.
Figure 2F:
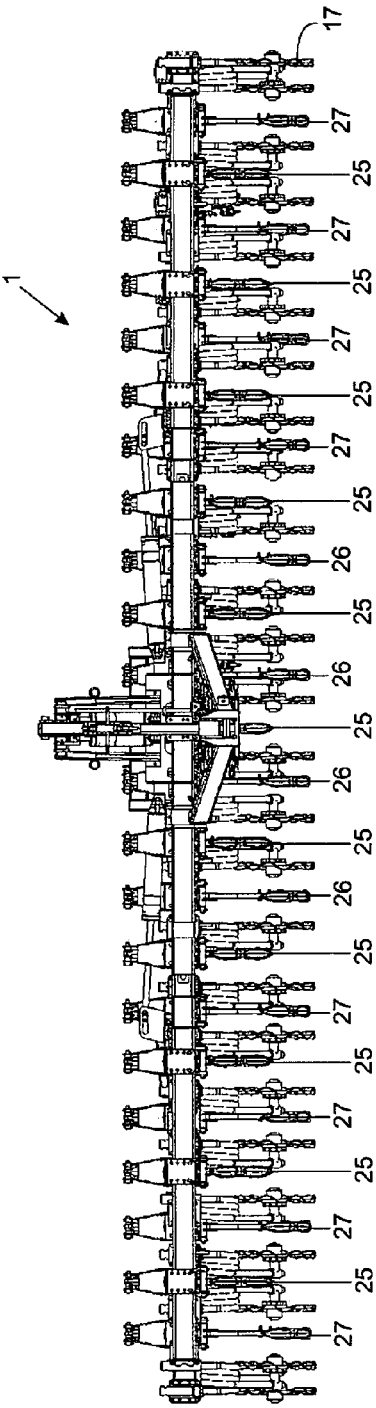
FIG. 2F is a rear end view of the apparatus depicted in FIG. 2E.

Referring to FIG. 2E and FIG. 2F, the tillage apparatus 1 as described above being dragged by tractor 30 may have the front row of primary tillage shanks 25 raised in a disengaged positions, but the middle and rear rows of primary tillage shanks 26,27 are lowered in soil engaging positions. Like the arrangement in FIG. 2C and FIG. 2D, such an arrangement results in wider furrow spacing than the arrangement in FIG. 2A and FIG. 2B, however, the furrows created by the arrangement in FIG. 2E and FIG. 2F are offset from those created by the arrangement in FIG. 2C and FIG. 2D. FIG. 2F shows a rear view of this arrangement with the wheels and harrows removed for clarity. It can be readily seen from FIG. 2F that the twelve primary tillage shanks 26,27 of the middle and rear rows with their chisel plows in the soil engaging position are still equidistantly spaced in a transverse direction. Even furrow spacing is therefore achieved, but with a wider furrow spacing than in FIG. 2A and FIG. 2B.

Referring to FIG. 3, enlarged views are shown of selectively moveable primary tillage shank 25 used in the apparatus depicted in FIG. 2. Primary tillage shanks 26,27 from FIG. 2 are identical. FIGS. 3A-3C show the shank in its lowered soil engaging position while FIGS. 3D-3F show the shank in its raised disengaged position. The shank 25 has chisel plow 35 mounted thereon at the soil engaging end of the shank. The shank is fixedly secured at the other end of the shank to shank bracket 36 by a bolt through upper bolt hole 41 in the shank bracket. There are three bolt holes 41,42,43 in the shank bracket to which the shank may be secured. Less soil penetration by the shank and shallower furrows are achieved by securing the shank through upper bolt hole 41. More soil penetration by the shank and deeper furrows are achieved by securing the shank through lower bolt hole 43. Shank penetration depth may be adjusted in this manner. Shank bracket 36 is rotatably mounted on mounting bracket 37 by virtue of pin 38. Further connection shank bracket 36 to mounting bracket 37 is dual-acting hydraulic cylinder 45. Hydraulic cylinder 45 is rotatably attached to shank bracket 36 by virtue of pin 46 and rotatably attached to mounting bracket 37 by virtue of pin 47. Mounting bracket 37 is fixedly secured to frame-member 50 with U-shaped bracket members 39.

Figure 3A:
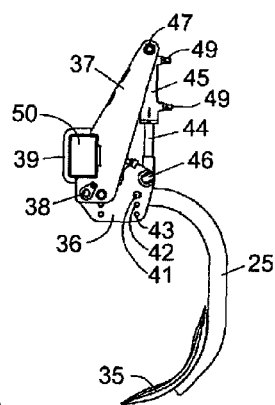
FIGS. 3A-3C are enlarged views of a selectively moveable shank used in the apparatus of FIG. 1A and lowered into a soil engaging position, where
Figure 3D:
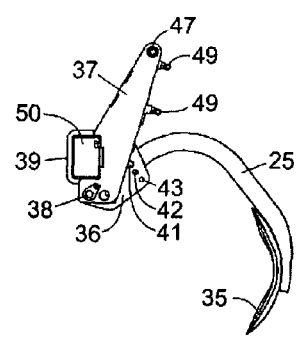
FIGS. 3D-3F are enlarged views of the selectively moveable shank of FIGS. 3A-3C but raised in a disengaged position, where
Figure 3B:
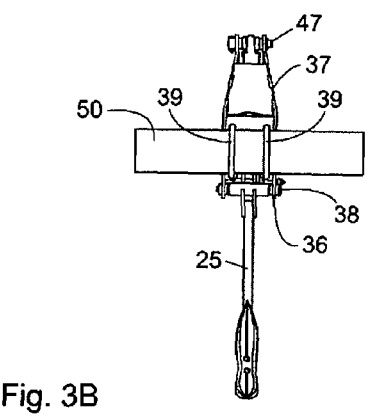
Figure 3E:
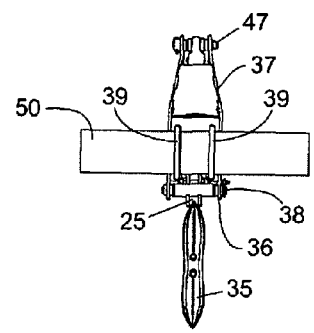
Figure 3C:
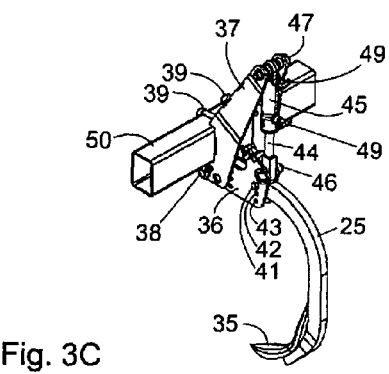
Figure 3F:
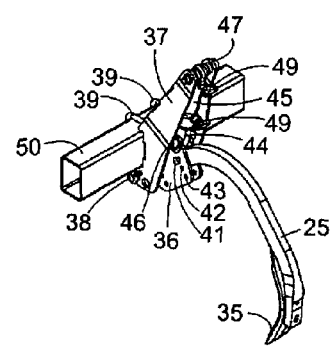

In operation, when cylinder arm 44 of hydraulic cylinder 45 is extended, shank bracket 36 rotates on pin 38 and forces shank 25 down into the soil engaging position, as best shown in FIG. 3A and FIG. 3C. When cylinder arm 44 of hydraulic cylinder 45 is retracted, shank bracket 36 rotates the other direction on pin 38 and forces shank 25 up out of the soil engaging position into the disengaged position, as shown best in FIG. 3D and FIG. 3F. Hydraulic cylinder 45 receives and returns hydraulic fluid to a fluid reservoir on the tractor through hydraulic lines connected to cylinder ports 49. Actuation of the hydraulic cylinder is controlled by an operator in the cab of the tractor.

Figure 4A:
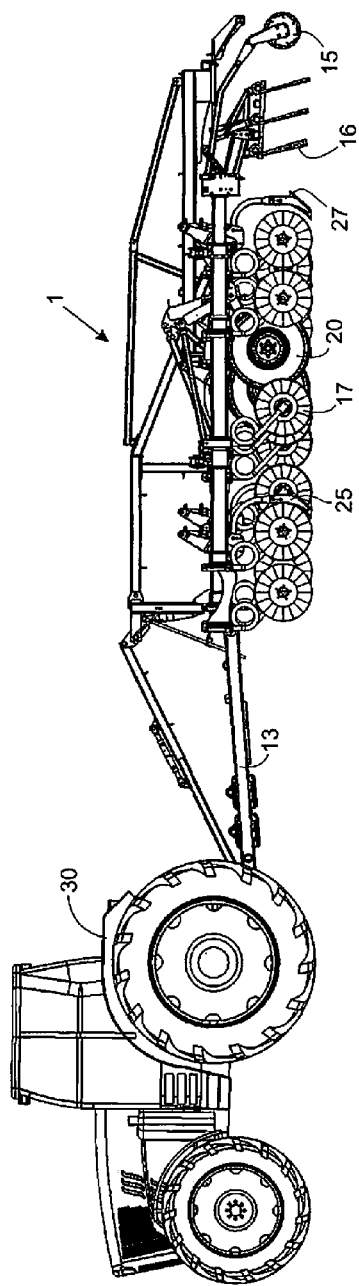
FIG. 4A is a side view of the apparatus of FIG. 1A being pulled by a tractor and configured for application of fertilizer in autumn with chisel plows on front, middle and rear rows of primary tillage shanks with all rows of primary tillage shanks lowered into soil engaging positions.
Figure 4B:
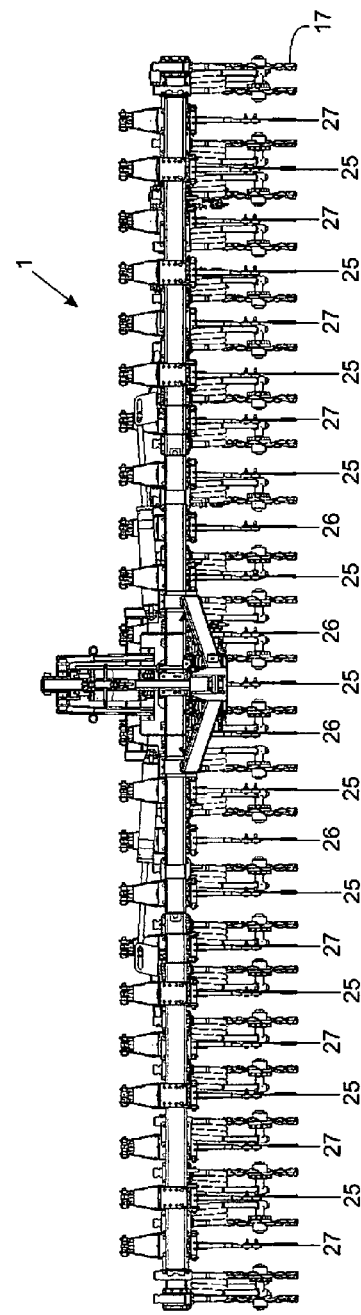
FIG. 4B is a rear end view of the apparatus depicted in FIG. 4A.
Figure 5A:
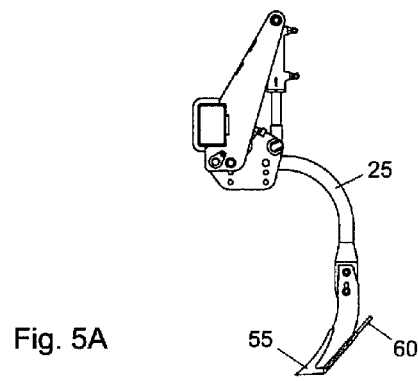
FIGS. 5A-5C are enlarged views of a selectively moveable shank configured for application of fertilizer as used in the apparatus of FIG. 4A and lowered into a soil engaging position, where
Figure 5D:
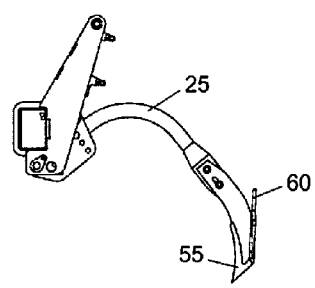
FIGS. 5D-5F are enlarged views of the selectively moveable shank of FIGS. 5A-5C but raised in a disengaged position, where
Figure 5B:
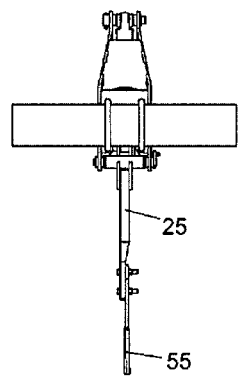
Figure 5E:
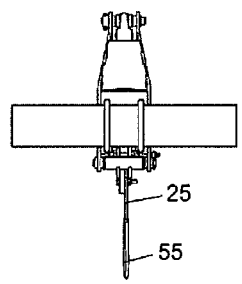
Figure 5C:
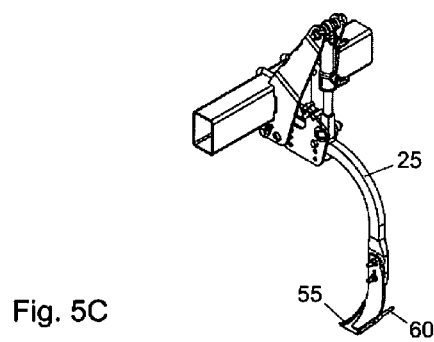
Figure 5F:
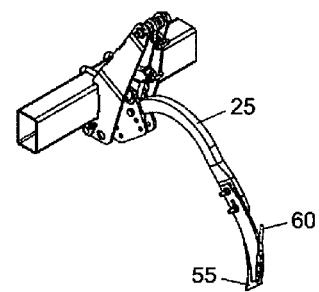

Referring to FIG. 4A and FIG. 4B, the tillage apparatus 1 as described above being dragged by tractor 30 has all of its primary tillage shanks 25,26,27 lowered into soil engaging positions. This is the same as the arrangement in FIG. 2A and FIG. 2B. The arrangement of FIG. 4A and FIG. 4B differs from FIG. 2A and FIG. 2B in that a different shaped chisel plow is mounted to the primary tillage shank and fertilizer feeder 60 is mounted on the shank in conjunction with the chisel plow, as best shown in FIG. 5 described below. Such an arrangement is useful for autumn primary tillage operations in which fertilizer (e.g. anhydrous ammonia) is mixed into the soil.

Referring to FIG. 5, enlarged views are shown of selectively moveable primary tillage shank 25 used in the apparatus depicted in FIG. 4. Primary tillage shanks 26,27 from FIG. 4 are identical. FIGS. 5A-5C show the shank in its lowered soil engaging position while FIGS. 5D-5F show the shank in its raised disengaged position. Most of the features are the same as those described in connection with FIG. 3. However, in FIG. 5, chisel plow 55 mounted on primary tillage shank 25 is smaller and slimmer than the chisel plow depicted in FIG. 3. This provides space to mount fertilizer feeder 60 on shank 25 to be used in conjunction with chisel plow 55. Fertilizer (e.g. anhydrous ammonia) is fed into feeder 60 through air lines connected to an air cart having a fertilizer hopper mounted thereon (lines, air cart and hopper not shown). Fertilizer is fed directly from feeder 60 into the furrows created by the primary tillage shanks and chisel plow.

Figure 6A:
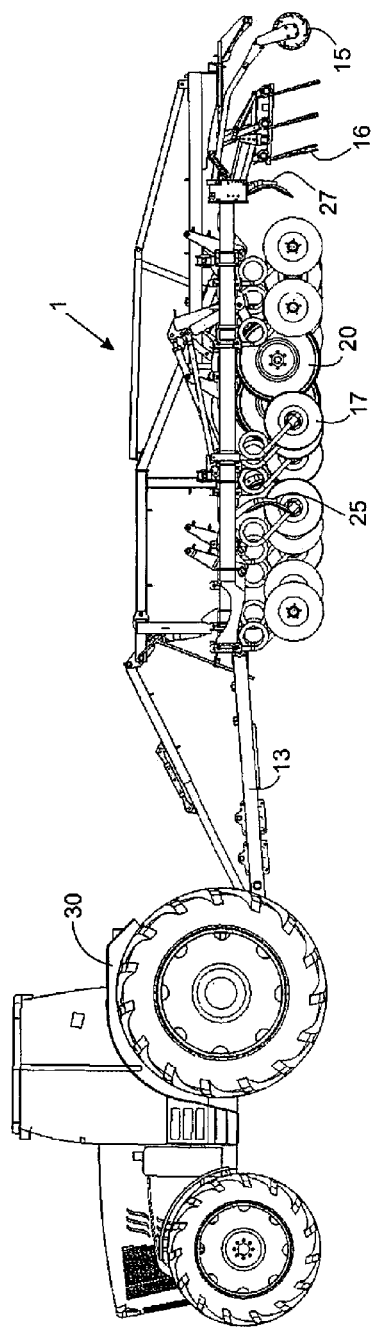
FIG. 6A is a side view of the apparatus of FIG. 1A being pulled by a tractor and configured for use in spring with disks instead of coulter wheels and with chisel plows on front, middle and rear rows of primary tillage shanks, all rows of primary tillage shanks raised in disengaged positions; and, FIG. 6B is a rear view of the apparatus of FIG. 6A.
Figure 6B:
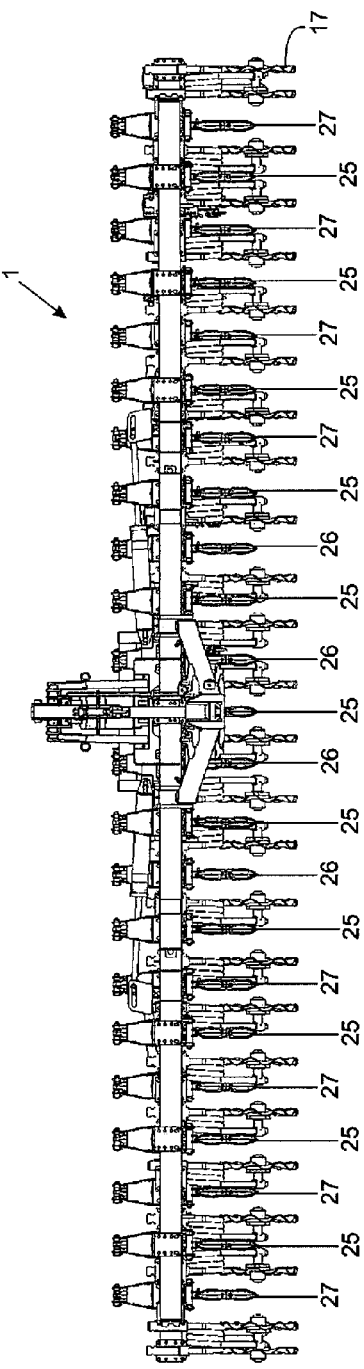

Referring to FIG. 6A and FIG. 6B, the tillage apparatus 1 as described in FIG. 1 being dragged by tractor 30 has all of its primary tillage shanks 25,26,27 raised into their disengaged positions. This arrangement is a conservation tillage configuration useful for spring seed bed preparation operations. Coulter wheels 17 on coiled shanks, harrow tines 16 and rolling harrows 15 are all secondary tillage implements designed for conservation tillage. Thus, the apparatus with its primary tillage shanks all selectively raised in the disengaged position can be used purely as a conservation tillage apparatus. FIG. 6B most clearly shows that all of the primary tillage shanks 25,26,27 in the front, middle and rear transverse rows are in the raised position.

The novel features of the present invention will become apparent to those of skill in the art upon examination of the detailed description of the invention. It should be understood, however, that the scope of the claims should not be limited by the preferred embodiments set forth in the examples, but should be given the broadest interpretation consistent with the specification as a whole.

The invention claimed is:

1. A method of tilling or preparing a seed bed in a field, comprising:
    dragging a tillage apparatus around a field, the tillage apparatus comprising a cultivator frame configured for both primary and conservation tillage, the cultivator frame comprising a plurality of longitudinally spaced apart transverse frame-members and a plurality of transversely spaced apart longitudinal frame-members forming a single unitary rigid structure, the cultivator frame further comprising at least a pair of wheels and a drawbar with a hitch for connection to a vehicle, at least one secondary tillage tool mounted on one of the transverse frame members, a plurality of primary tillage shanks mounted on the same transverse frame member as the at least one secondary tillage tool, and a plurality of dual-acting hydraulic cylinders mounted on the same frame member as the primary tillage shanks and the at least one secondary tillage tool, each of the plurality of primary tillage shanks individually moveable by its own dual-acting hydraulic cylinder in the same direction as an adjacent primary tillage shank and selectively moveable by its respective dual-acting hydraulic cylinder between a lowered soil engaging position and a raised disengaged position without lowering or raising the frame and without affecting engagement of the at least one secondary tillage tool with soil, each of the primary tillage tools selectively lockable by its respective dual-acting hydraulic cylinder when in the soil engaging position, the tillage apparatus being dragged with the at least one secondary tillage tool engaged with the field at a conservation tillage depth to perform conservation tillage of the field; and,
    selectively actuating at least one adjacent pair of the plurality of dual-acting hydraulic cylinders to selectively lower its respective adjacent pair of primary tillage shanks to the soil engaging position without lowering the frame, the soil engaging position at a primary tillage depth greater than the conservation tillage depth, to thereby perform primary tillage of the field when the field is in need of primary tillage and selectively locking the at least one adjacent pair of primary tillage shanks in the soil engaging position using its respective dual-acting hydraulic cylinder, or selectively actuating at least one adjacent pair of the plurality of dual-acting hydraulic cylinders to selectively raise its respective adjacent pair of primary tillage shanks without raising the frame to disengage the shank from the field when the field is not in need of primary tillage to continue performing conservation tillage of the field.

2. The method according to claim 1, wherein the at least one secondary tillage tool comprises a plurality of secondary tillage tools mounted on the frame in a plurality of transverse rows, the plurality of secondary tillage tools comprising one or more of coulter wheels, tine harrows and rolling harrows.

3. The method according to claim 1, further comprising lowering the primary tillage shanks on-the-fly in the field.

4. The method according to claim 1, further comprising adjusting the primary tillage depth at which the primary tillage shanks are in the soil when the primary tillage shank is in the lowered soil engaging position without raising or lowering the frame.

5. A method of tilling or preparing a seed bed in a field, comprising:
dragging a tillage apparatus around a field, the tillage apparatus comprising a cultivator frame configured for both primary and conservation tillage, the cultivator frame comprising a plurality of longitudinally spaced apart transverse frame-members and a plurality of transversely spaced apart longitudinal frame-members forming a single unitary rigid structure, the cultivator frame further comprising at least a pair of wheels and a drawbar with a hitch for connection to a vehicle, at least one secondary tillage tool mounted on, one of the transverse frame members a plurality of primary tillage shanks mounted on the same transverse frame member as the at least one secondary tillage tool, and a plurality of dual-acting hydraulic cylinders mounted on the same frame member as the primary tillage shanks and the at least one secondary tillage tool, each of the plurality of primary tillage shanks individually moveable by its own dual-acting hydraulic cylinder in the same direction as an adjacent primary tillage shank and selectively moveable by its respective dual-acting hydraulic cylinder between a lowered soil engaging position and a raised disengaged position without lowering or raising the frame and without affecting engagement of the at least one secondary tillage tool with soil, each of the primary tillage tools selectively lockable by its respective dual-acting hydraulic cylinder when in the soil engaging position, the tillage apparatus being dragged with the at least one secondary tillage tool engaged with the field at a conservation tillage depth to perform conservation tillage of the field;
selectively actuating at least one adjacent pair of the plurality of dual-acting hydraulic cylinders to selectively lower its respective adjacent pair of primary tillage shanks to the soil engaging position without lowering the frame, the soil engaging position at a primary tillage depth greater than the conservation tillage depth, to thereby perform primary tillage of the field when the field is in need of primary tillage and selectively locking the at least one adjacent pair of primary tillage shanks in the soil engaging position using its respective dual-acting hydraulic cylinder, or selectively actuating at least one adjacent pair of the plurality of dual-acting hydraulic cylinders to selectively raise its respective adjacent pair of primary tillage shanks without raising the frame to disengage the shank from the field when the field is not in need of primary tillage to continue performing conservation tillage of the field;
wherein the tillage apparatus comprises at least a front transverse row of the primary tillage shanks and a rear transverse row of the primary tillage shanks, the shanks in the front row in different longitudinal lines in relation to the shanks in the rear row, the front row selectively moveable as a gang between the lowered soil engaging position and the raised disengaged position and the rear row selectively moveable as a gang independently of the front row between the lowered soil engaging position and the raised disengaged position the method further comprising placing the apparatus in a first configuration with the front row in the lowered soil engaging position and the rear row in the raised disengaged position or the front row in the raised disengaged position and the rear row in the lowered soil engaging position to perform primary tillage of the soil with a first equidistant furrow spacing, or placing the apparatus in a second configuration with the front and rear rows in the lowered soil engaging position to perform primary tillage of the soil with a second equidistant furrow spacing narrower that the first furrow spacing, or placing the apparatus in a third configuration with the front and rear rows of primary tillage shanks in the raised disengaged position to perform conservation tillage of the soil at the conservation tillage depth using only the secondary tillage tool.

6. The method according to claim 5, wherein in the first configuration the front row is in the lowered soil engaging position and the rear row is in the raised disengaged position.

7. The method according to claim 5, wherein in the first configuration the front row is in the raised disengaged position and the rear row is in the lowered soil engaging position.

8. The method according to claim 5, further comprising applying fertilizer and/or pesticide to the field through feeders mounted in association with the primary tillage tools.

9. The method according to claim 5, further comprising lowering the primary tillage shanks on-the-fly in the field.

10. The method according to claim 5, wherein the at least one secondary tillage tool comprises a plurality of secondary tillage tools mounted on the frame in a plurality of transverse rows, the plurality of secondary tillage tools comprising one or more of coulter wheels, tine harrows and rolling harrows.

11. The method according to claim 5, further comprising adjusting the primary tillage depth at which the primary tillage shanks are in the soil when the primary tillage shank is in the lowered soil engaging position without raising or lowering the frame.

12. The method according to claim 5, wherein the front transverse row consists essentially of eleven primary tillage shanks and the rear transverse row consists essentially of eight primary tillage shanks.

13. A method of tilling or preparing a seed bed in a field, comprising:
dragging a tillage apparatus around a field, the tillage apparatus comprising a cultivator frame configured for both primary and conservation tillage, the cultivator frame comprising a plurality of longitudinally spaced apart transverse frame-members and a plurality of transversely spaced apart longitudinal frame-members forming a single unitary rigid structure, the cultivator frame further comprising at least a pair of wheels and a drawbar with a hitch for connection to a vehicle, at least one secondary tillage tool mounted on one of the transverse frame members, a plurality of primary tillage shanks mounted on the same transverse frame member as the at least one secondary tillage tool, and a plurality of dual-acting hydraulic cylinders mounted on the same frame member as the primary tillage shanks and the at least one secondary tillage tool, each of the plurality of primary tillage shanks individually moveable by its own dual-acting hydraulic cylinder in the same direction as an adjacent primary tillage shank and selectively moveable by its respective dual-acting hydraulic cylinder between a lowered soil engaging position and a raised disengaged position without lowering or raising the frame and without affecting engagement of the at least one secondary tillage tool with soil, each of the primary tillage tools selectively lockable by its respective dual-acting hydraulic cylinder when in the soil engaging position, the tillage apparatus being dragged with the at least one secondary tillage tool engaged with the field at a conservation tillage depth to perform conservation tillage of the field;

selectively actuating at least one adjacent pair of the plurality of dual-acting hydraulic cylinders to selectively lower its respective adjacent pair of primary tillage shanks to the soil engaging position without lowering the frame, the soil engaging position at a primary tillage depth greater than the conservation tillage depth, to thereby perform primary tillage of the field when the field is in need of primary tillage and selectively locking the at least one adjacent pair of primary tillage shanks in the soil engaging position using its respective dual-acting hydraulic cylinder, or selectively actuating at least one adjacent pair of the plurality of dual-acting hydraulic cylinders to selectively raise its respective adjacent pair of primary tillage shanks without raising the frame to disengage the shank from the field when the field is not in need of primary tillage to continue performing conservation tillage of the field;

wherein the tillage apparatus comprises at least a front transverse row of the primary tillage shanks, a rear transverse row of the primary tillage shanks, and a middle transverse row of the primary tillage shanks, the shanks in the front row in different longitudinal lines in relation to the shanks in the rear and middle rows, the front row selectively moveable as a gang between the lowered soil engaging position and the raised disengaged position and the rear and middle rows selectively moveable as a gang independently of the front row between the lowered soil engaging position and the raised disengaged position the method further comprising i) placing the apparatus in a first configuration with the front row in the lowered soil engaging position and the rear and middle rows in the raised disengaged position or the front row in the raised disengaged position and the rear and middle rows in the lowered soil engaging position to perform primary tillage of the soil with a first equidistant furrow spacing, and ii) placing the apparatus in a second configuration with the front, rear and middle rows in the lowered soil engaging position to perform primary tillage of the soil with a second equidistant furrow spacing narrower than the first furrow spacing, and iii) placing the apparatus in a third configuration with the front, rear and middle rows of primary tillage shanks in the raised disengaged position to perform conservation tillage of the soil at the conservation tillage depth using only the secondary tillage tool.

14. The method according to claim 13, wherein in the first configuration the front row is in the lowered soil engaging position and the rear and middle rows are in the raised disengaged position.

15. The method according to claim 13, wherein in the first configuration the front row is in the raised disengaged position and the rear and middle rows are in the lowered soil engaging position.

16. The method according to claim 13, further comprising lowering the primary tillage shanks on-the-fly in the field.

17. The method according to claim 13, wherein the at least one secondary tillage tool comprises a plurality of secondary tillage tools mounted on the frame in a plurality of transverse rows, the plurality of secondary tillage tools comprising one or more of coulter wheels, tine harrows and rolling harrows.

18. The method according to claim 13, further comprising adjusting the primary tillage depth at which the primary tillage shanks are in the soil when the primary tillage shank is in the lowered soil engaging position without raising or lowering the frame.

19. The method according to claim 13, wherein the front transverse row consists essentially of eleven primary tillage shanks, the rear transverse row consists essentially of eight primary tillage shanks and the middle row consists essentially of four primary tillage shanks.

* * * * *